United States Patent [19]

Borst et al.

[11] Patent Number: 5,105,441

[45] Date of Patent: Apr. 14, 1992

[54] DEVICE FOR POTENTIAL-FREE TRANSMISSION OF DATA

[75] Inventors: Wolfgang Borst; Wolfgang Botzenhardt, both of Schwieberdingen; Siegfried Dais, Gerlingen; Otto Karl, Leonberg; Uwe Kiencke, Regensburg; Martin Litschel, Vaihingen; Herbert Lohner, Friolzheim, all of Fed. Rep. of Germany

[73] Assignee: Robert Bosch GmbH, Stuttgart, Fed. Rep. of Germany

[21] Appl. No.: 343,179

[22] PCT Filed: Jun. 13, 1988

[86] PCT No.: PCT/DE88/00354

§ 371 Date: Mar. 7, 1989

§ 102(e) Date: Mar. 7, 1989

[87] PCT Pub. No.: WO89/00368

PCT Pub. Date: Jan. 12, 1989

[30] Foreign Application Priority Data

Jul. 7, 1987 [DE] Fed. Rep. of Germany ....... 3722415

[51] Int. Cl.$^5$ .............................................. H04L 25/34
[52] U.S. Cl. ........................................ 375/17; 375/36; 370/85.14
[58] Field of Search ............................ 375/17, 36, 121; 307/270, 446, 448; 340/825.03, 825.5; 370/85.6, 85.14

[56] References Cited

U.S. PATENT DOCUMENTS

| | | | |
|---|---|---|---|
| 3,731,002 | 5/1973 | Pierce | 370/85.14 |
| 3,875,332 | 4/1975 | Fletcher et al. | 375/36 |
| 4,412,141 | 10/1983 | Jacobsen | 375/36 |
| 4,445,222 | 4/1984 | Smitt | 307/270 |
| 4,825,450 | 4/1989 | Herzog | 375/17 |
| 4,875,223 | 10/1989 | Curtis | 375/121 |
| 4,881,244 | 11/1989 | Haug | 375/121 |

FOREIGN PATENT DOCUMENTS 2821812 11/1979 Fed. Rep. of Germany.
2361780 3/1978 France.

OTHER PUBLICATIONS

Kiencke et al "Automotive Serial Controller Area Network" SAE Technical Paper International Congress & Exposition Detroit, Mich. Feb. 24-28, 1986.

*Primary Examiner*—Stephen Chin
*Attorney, Agent, or Firm*—Michael J. Striker

[57] ABSTRACT

A device for potential-free transmission of dominant and recessive data bits in a bus system operating with bit-by-bit arbitration includes a series connection of a modulator, a galvanic separation circuit, and a demodulator. Data bits to be transmitted are scanned in the modulator at equidistant time intervals and are divided into two intermediate trains of data bits wherein the dominant bits alternate with the recessive bits. The two intermediate trains are applied to two input terminals of a galvanic separating device, and a demodulation is effected on the output side of the separating device.

13 Claims, 9 Drawing Sheets

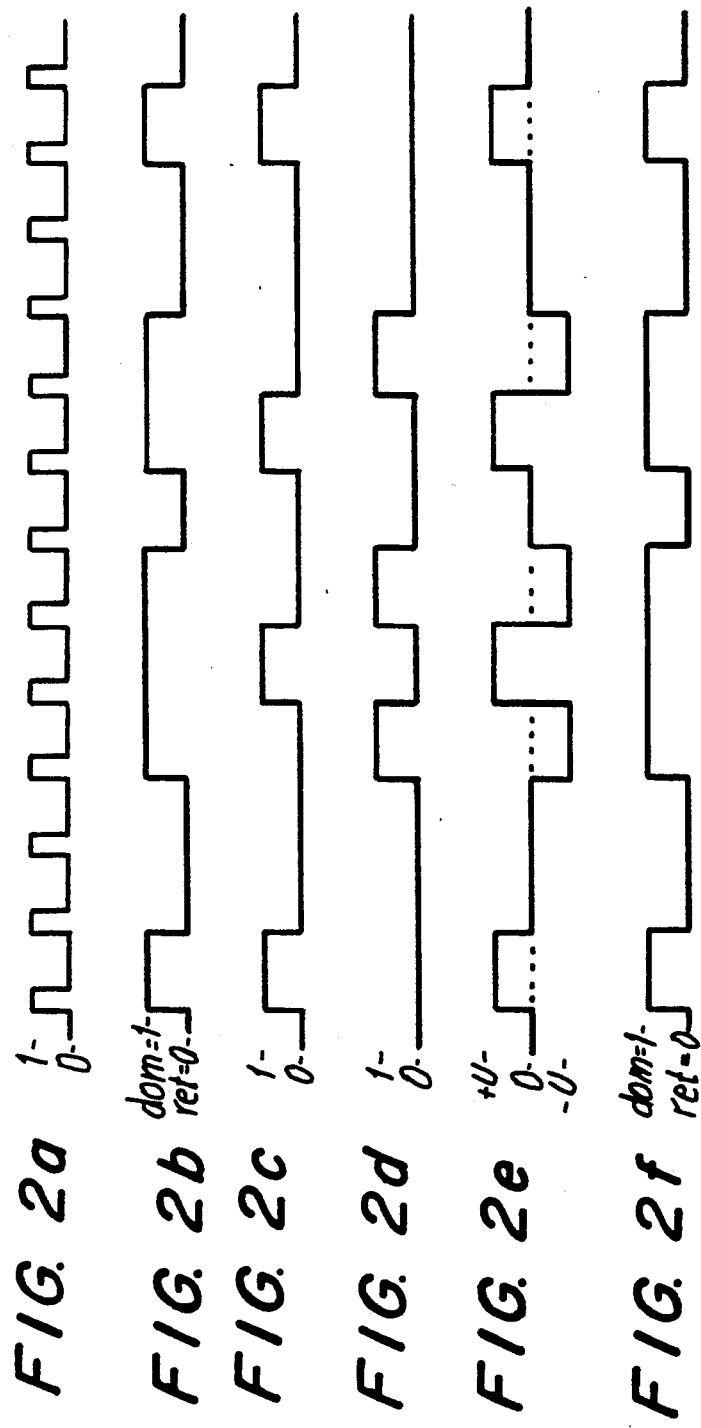

FIG. 4a
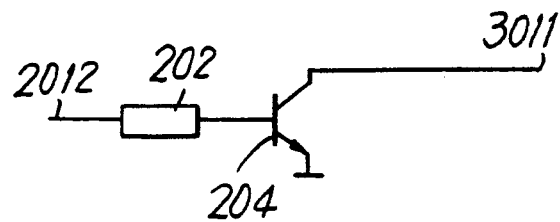
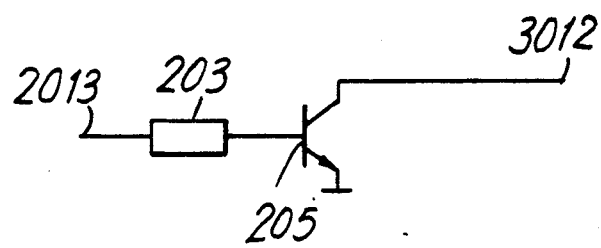
FIG. 4b
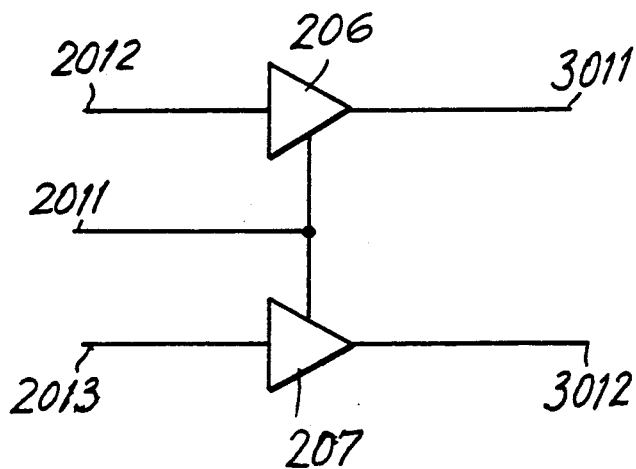

FIG. 6a
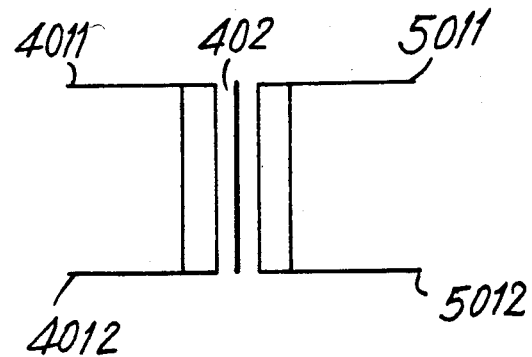
FIG. 6b
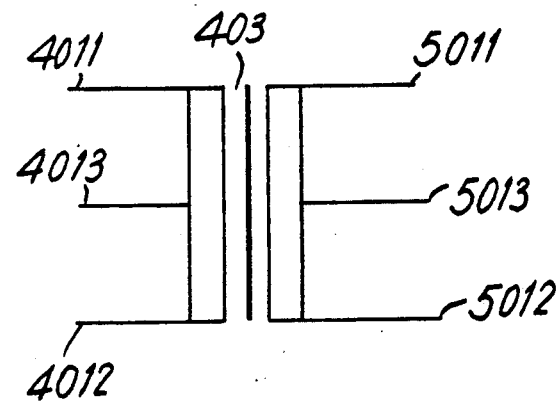
FIG. 6c
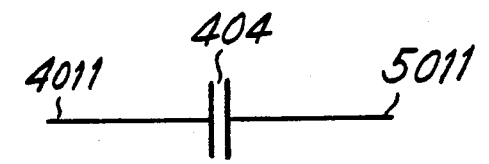
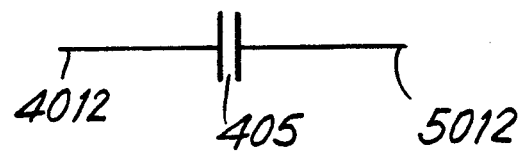

DEVICE FOR POTENTIAL-FREE TRANSMISSION OF DATA

PRIOR ART

The invention is based on a device for potential-free transmission of data in bus networks with bit-by-bit arbitration operating in response to dominant and recessive bit levels. This is a matter of providing a failure-tolerant bus coupling circuit with galvanic separation or decoupling, for a local multi-master network with the bit-by-bit arbitration.

A very effective method of bus allocation in local multi-master networks is bit-by-bit arbitration (e.g. CAN, ICC, DDB).

Multi-master networks with bit-by-bit arbitration operate with the logical bit levels which are physically represented on the bus by 'dominant' and 'recessive' states. The recessive bit level on the bus can be overwritten at any time by means of transmitting the dominant bit level. The bus content is decided in that the transmitter bus of a recessive bit during the simultaneous sensing of a dominant bit gives up the contest and becomes the receiver bus.

With this concept, the DC component of the signals is included in the transmission via the line.

Examples of these physical representations of logical bit levels on the bus are:

| 'dominant' bit level | 'recessive' bit level |
| --- | --- |
| low-impedance | high-impedance |
| light on | light off |
| voltage on | no voltage |
| power on | no power |

In the prior art networks with bit-by-bit bus arbitration, optoelectronic components must be used for galvanic decoupling or separation of the individual substations at least on the transmitting side, since these optoelectronic components can include the DC component in the transmission:
opto-coupler for coupling at a bus with electrical line;
optical transmitter and receiver at a light wave-guide bus with star coupler.

Opto-couplers are components with relatively high failure rates which can not be used at extreme temperatures or at rapid changes in temperature.

Because of the required 'dominant' and 'recessive' bit levels, only opto-couplers with open collector outputs are taken into consideration for the target network. During breakdown of this output transistor the 'dominant' bit level is generated, and the entire network is blocked.

Optical transmitters and receivers at the light waveguide with star coupler are too expensive and too unreliable for use in motor vehicle networks.

The limitations in the use of light guides and optical plug-in contacts do not at present allow use under extreme conditions (e.g. in motor vehicles).

If light ('dominant' bit level) is continuously produced during the failure of a driver of the transmitting element, the entire network is blocked. During failure of the star coupler the network is likewise blocked.

It is the object of the invention to provide a device for potential-free transmission of data which does not block the transmission path during the failure of a station and is reliable and inexpensive with respect to its use in large quantities, particularly in motor vehicles.

ADVANTAGES OF THE INVENTION

An electrical potential separation between the input and output of the device of this invention is achieved so that network stations equipped with the device can also be operated when the individual stations are at different potentials or when strong inphase interferences occur on the busline.

Differential interferences which are imported into the respective station via the busline are decoupled (positive differential interference) or limited (negative differential interference), respectively, at the demodulator. The circuit blocks located after the demodulator as seen from the busline, are accordingly protected from destruction.

During failure or short circuiting of a block of the coupling circuit prior to the separating device, e.g. of a driver or interface block, the bus traffic on the busline between the remaining station is not impaired, since the bus is decoupled by means of the separating device and demodulator.

The device is very reliable and inexpensive, so that it can be used e.g. in motor vehicles.

BRIEF DESCRIPTION OF THE DRAWING

Embodiment examples of the invention are shown in the drawing and are explained in more detail in the following description.

FIG. 2 shows a time-dependent diagram for the operation of the device;

FIG. 4 shows example of a driver circuit for the device;

FIG. 6 shows examples of the galvanic separation circuit;

DESCRIPTION OF THE PREFERRED EMBODIMENTS a) Bus System

Figure 1:
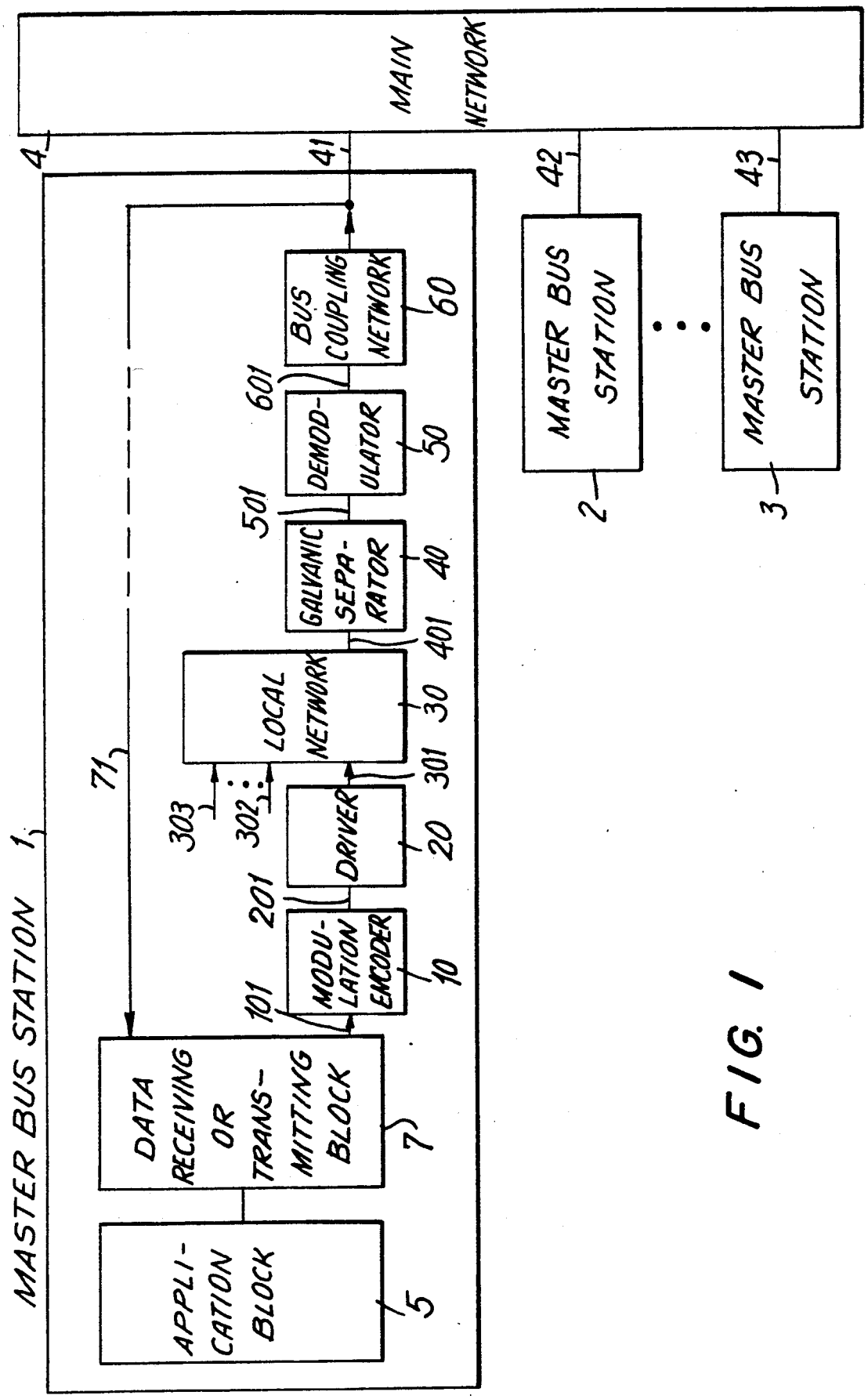
FIG. 1 shows a block diagram of the device of the invention in connection with the overall bus system of a global or main network, e.g. in a motor vehicle.

FIG. 1 shows the block diagram of the overall bus system of a main network for use in a power supply system of a motor vehicle.

It comprises master bus stations 1, 2, 3 in connection with a global or main network 4. The master bus stations 1, 2, 3 are connected to the main network 4 via the bus lines 41, 42, 43. Every master bus station comprises modulation encoder 10, driver 20, local network 30, galvanic separation circuit 40, demodulator 50 and bus coupling network 60. The signal to be transmitted is generated by an interface block 7 and is available at bus line 101. The interface block 7 also processes the received signal which is present at line 71, possibly modified by means of additional blocks.

b) Description of a Master Bus Station (using bus station 1 by way of example)

The digital signal to be transmitted from the interface block 7 is applied via the lines 101 to the modulation encoder 10. The latter produces two intermediate code signals without DC component (FIGS. 2c and 2d) from the input signal with DC component (FIG. 2b). The outputs of the modulation encoder 10 are connected via lines 201 to the inputs of the driver 20. The outputs of the driver 20 are connected to the inputs of the local network 30 via lines 301. This network 30 can comprise additional inputs 302, 303 etc. in order to couple with one another interface blocks and application circuits of additional substations each having a corresponding modulation encoder and driver. The outputs of the local network 30 are connected via lines 401 to the inputs of the galvanic separation circuit 40. The outputs of the galvanic separation circuit 40 are applied to the inputs of the demodulator 50 via lines 501. A signal with DC component is generated again in the demodulator from the galvanically decoupled or separated intermediate code signals without DC component. The outputs of the demodulator 50 are connected to the inputs of the bus coupling network 60 via lines 601. The outputs of the bus coupling network 60 are connected to the inputs of the main network 4 via the bus lines 41; moreover, a signal received at the output of the network 60 is fed from this location via lines 71, possibly via additional (non-illustrated) blocks, to the interface block 7. This interface block 7 assembles the read bits of the fed back signal and transmits the resulting data via line 6 to the application circuit 5. Many participating master bus stations can be interconnected by the main network 4 over a greater distance.

The local network 30 can also be dispensed with. The outputs 301 of the driver 20 are then connected directly to the inputs 401 of the galvanic separation circuit 40.

Modulation encoder 10 and driver 20 can also be integrated in the interface block in an inexpensive manner. For this reason, the modulation encoder and driver are directly connected with the interface block.

An example of the manner of operation of the transmission device of the invention is shown in FIG. 2 with the aid of the time-dependent diagram. FIG. 2a shows the clock signal having a frequency at which the processing of the arriving data to be transmitted is effected in the modulation encoder 10. The signal to be transmitted is shown in FIG. 2b. Changes in the bit level are possible in each instance only in synchronism with the clock pulses. The signal to be transmitted is converted by means of the modulation encoder 10 into two intermediate code signals shown in FIG. 2c and FIG. 2d, which serve to control a galvanic separating element. These intermediate code signals, according to FIG. 2c and FIG. 2d, are both at logical '0' during the transmission of a recessive bit, but are alternately at logical '0' and logical '1' when transmitting a dominant bit. In other words, time intervals of the dominant single bit levels of one intermediate code signal (FIG. 2c) coincide with time intervals of the recessive single bit levels of the other intermediate code signal (FIG. 2d), and time intervals of the dominant single bit levels of the other intermediate code signal coincide with time intervals of the recessive single bit levels of the one intermediate code signal. FIG. 2e shows the 'modulated' intermediate output signal after the galvanic separation. In this instance, there is a positive voltage +4 during each dominant bit of the intermediate code signal of FIG. 2c and a negative voltage 4 during each dominant bit of the other intermediate code signal (FIG. 2d), but zero voltage during coincidence of a recessive bit in both intermediate code signals. After the demodulation of the 'modulated' output signal, the original signal configuration, as shown in FIG. 2f, is obtained again. The result is a potential-separated transmission of a signal which corresponds with respect to its configuration to the original transmitted signal according to FIG. 2b.

Embodiment examples of the individual component blocks of the device of the invention incorporated in the bus stations of the system, according to FIG. 1, are described in more detail in the following.

c) Modulation Encoder

Figure 3A:
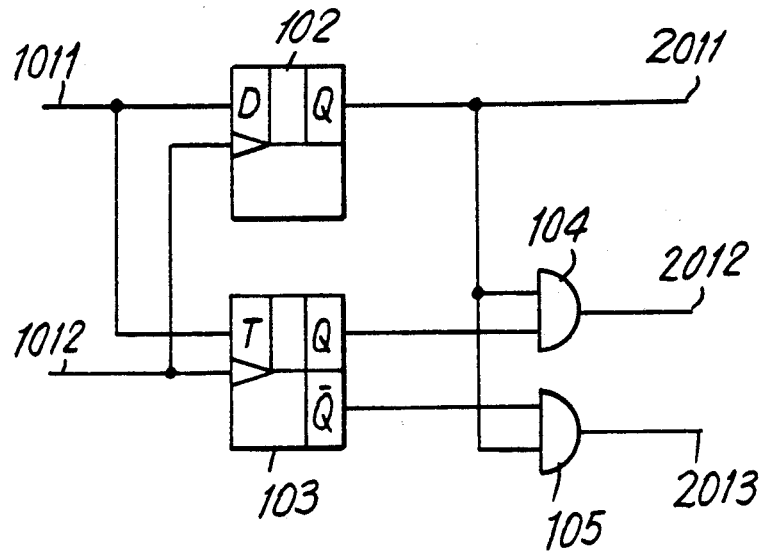
FIG. 3 shows two embodiments of a modulation encoder for the device.
Figure 3B:
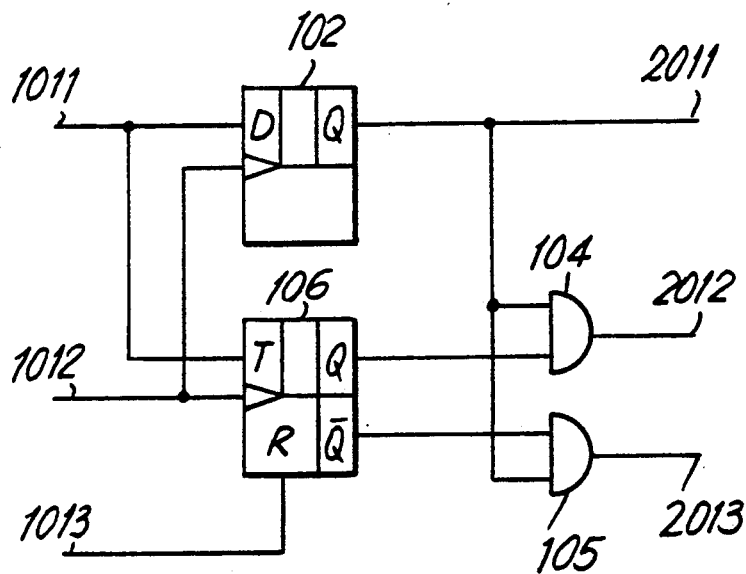

FIGS. 3a and 3b show two embodiment examples for the modulation encoder 10.

The modulation encoder 10 has the object of preparing the signal to be transmitted for the connection to a galvanic separating element. The transmitted signal (FIG. 2b) is acted upon by the clock signal (FIG. 2a) which acts as a modulation code carrier for this purpose. The latter can advisably have the same frequency as the bit clock of the transmitted signal or can have a higher frequency.

It is possible to let the modulation encoder run freely or to synchronize it, e.g. to start the modulation encoders of all bus substations in the same manner at the start of each transmission. A synchronization ensures that the intermediate code signals of all bus substations are in the same phase. This is necessary if the intermediate code signals of a plurality of substations are coupled in the local network 30.

FIG. 3a shows an embodiment example of an unsynchronized modulation encoder.

The transmitted signal is applied to the input line 1011 and is applied to the D-input of a D-flip-flop 102 and to the T-input of a toggle flip-flop 103. The clock signal reaches the clock inputs of the two flip-flops 102 and 103 via the input line 1012. The Q-output of the D-flip-flop 102 is applied to one input of the logical AND gates 104 and 105 in each instance and also leads to the output line 2011. The Q-output of the toggle flip-flop 103 is applied to the second input of the AND gate 104, the Q-inverted output is applied to the second input of the AND gate 105. The outputs of the AND gates 104 and 105 form the output lines 2012 and 2013. Operation:

The D-flip-flop 102 and the toggle flip-flop 103 are clocked with the clock signal; the transmitted signal is applied to the D- and T-inputs, respectively, of the two flip-flops. In this case, the 'dominant' level is a logical '1' and the 'recessive' level is a logical '0'. The D-flip-flop 102 synchronizes the transmitted signal according to the clock signal. The toggle flip-flop 103 changes state at a 'dominant' transmitted signal with every clock pulse edge, so that its Q- and Q-inverted outputs change polarity with every clock pulse. By means of the AND gating relation of the Q- and Q-inverted outputs of the toggle flip-flop with the synchronized transmitted signal, it is achieved that the output lines 2012 and 2013 are both at logical '0' during the transmission of a 'recessive' bit, but when transmitting a 'dominant' bit are alternately at logical '0' and logical '1' in the time intervals of the clock signal.

FIG. 3b shows an embodiment example of a synchronized modulation encoder.

In contrast to the unsynchronized modulation encoder according to FIG. 3a, the toggle flip-flop in this instance is reset by means of a synchronization signal. For this purpose, the synchronization signal is applied to the 'reset' input of the toggle flip-flop 106 via the line 1013. The synchronization signal can be e.g. a short pulse at the start of a new communication.

The outputs of this modulation encoder behave logically in the same way as in the unsynchronized modulation encoder; the phase relation of the modulation encoder outputs 2012 and 2013 in this instance is additionally defined with respect to all other modulator encoder outputs, also synchronized outputs, and are connected to the local network 30.

d) Driver

FIGS. 4a and 4b show respectively embodiment examples for an open collector driver and for a push-pull driver. Such a push-pull driver is obtainable e.g. under the designation SN74126 from the company TEXAS INSTRUMENTS.

The type of driver utilized depends on the manner in which the galvanic separation circuit is carried out. When a transformer with a center tap on the primary side is used, e.g. an open collector driver is used; a push-pull driver is used in a transformer without center tap on the primary side.

FIG. 4a shows an embodiment example of an open collector driver.

The input intermediate code signals FIGS. 2c and 2d coming via lines 2012 and 2013 from the modulation encoder 10 are guided to the base terminals of the n-p-n transistors 204 and 205 via the resistors 202 and 203. The emitter terminals of the transistor 204 and 205 are applied to ground potential. The collector terminals are connected with the output lines 3011 and 3012. The amplified signal can be taken off at the latter.

FIG. 4b shows an embodiment example of a push-pull driver.

In this instance the input signals coming via lines 2012 and 2013 from the modulation encoder 10 are applied to the signal inputs of two push-pull drivers 206 and 207. The drivers are tri-state drivers which can be switched to high impedance via the line 2011 to which the transmitted signal, which is synchronized with the modulator clock signal, is applied. The outputs of the two push-pull drivers 206 and 207 are connected to the output lines 3011 and 3012.

e) Local Network

Figure 5:
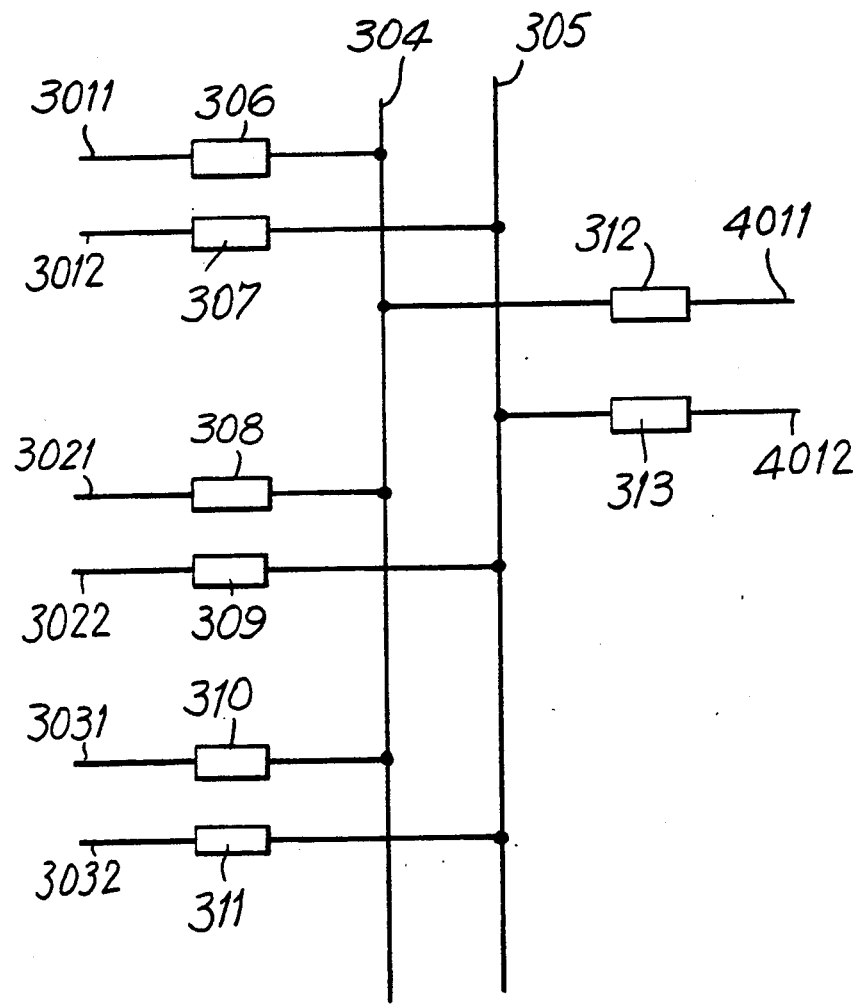
FIG. 5 shows an example of a local network.

FIG. 5 shows an embodiment example for a passive local network 30.

The driver outputs (3011, 3012), (3021, 3022), respectively, and (3031, 3032) of the individual local substations are connected via resistors 306 . . . 311 to the local buslines 304 and 305 in the same direction. The outputs 4011 and 4012 are likewise connected to the buslines 304 and 305 via the resistors 312 and 313. The resistors 306 . . . 311 and 312, 313, respectively, can be dispensed with if desired.

f) Galvanic separation circuit

FIGS. 6a to 6c show some embodiment examples for the galanic separation circuit 40.

FIGS. 6a and 6b show two constructions of galvanic separation by means of transformers, while FIG. 6c shows a galvanic separation by means of capacitors.

FIG. 6a shows a transformer 402 with single primary and secondary windings for galvanic separation. The input intermediate code signals are applied via lines 4011 and 4012 respectively to the primary winding of the transformer, while the secondary winding is connected with the output lines 5011 and 5012 delivering the 'modulated' output signal of FIG. 2e.

FIG. 6b shows a transformer 403 with center tap on the primary and secondary windings for galvanic separation. The input lines 4011 and 4012 are applied to the outer connections of the primary winding, the input line 4013 is applied to its center tap. The outer connections of the secondary winding are connected with the output lines 5011 and 5012, the center tap is connected with the output line 5013.

In the galvanic separation circuits according to FIGS. 6a and 6b, inphase interferences which can occur on the busline are blocked by the transformer. They can not reach the primary side of the transformer.

Two capacitors 404, 405 are used in the four terminal capacitor circuit of FIG. 6c for galvanic separation. The input lines 4011 and 4012 are connected with the output lines 5011 and 5012 via the two capacitors 404 and 405.

g) Demodulator

Figure 7A:
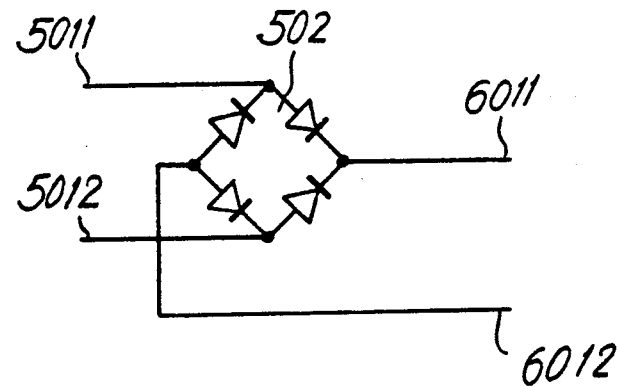
FIG. 7 shows circuit arrangement for the demodulation.
Figure 7B:
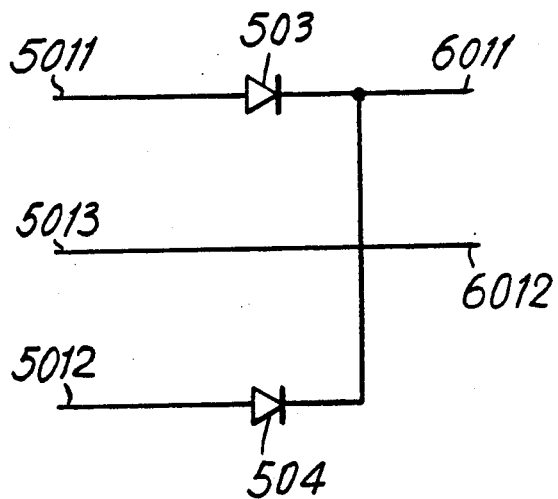

FIGS. 7a and 7b show two embodiment examples for the demodulator 50.

FIG. 7a shows a Graetz or bridge rectification. The input terminals of the bridge 502 are connected via lines 5011 and 5012 to the outputs of the galvanic separation 40. The demodulated signal (FIG. 2f) is available at the outputs 6011 and 6012 of the Graetz rectifier 502.

FIG. 7b shows a demodulator which is preferably connected to the output of a transformer (FIG. 6b) with a center tap on the secondary side. In this instance, the lines 5011 and 5012, are connected with the output line 6011 of the demodulator via the rectifying diodes 503 and 504. The center tap line 5013 arrives directly at the output line 6012.

h) Bus Coupling Network

Figure 8:
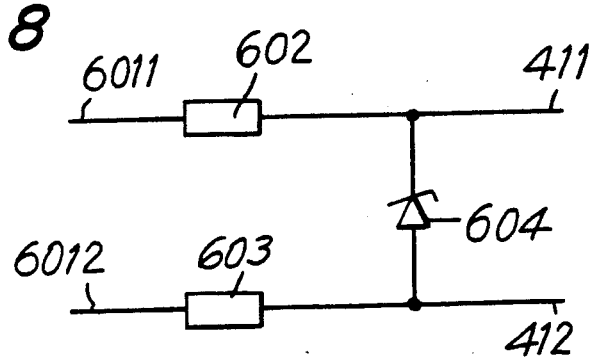
FIG. 8 shows a circuit arrangement for a bus coupling network.

FIG. 8 shows an embodiment example for the bus coupling network 60.

The input lines 6011 and 6012 are applied to the output lines 411 and 412 via the resistors 602 and 603. A Zener diode 604 can be connected between the output lines 411 and 412.

This diode prevents extreme bus levels from occurring outside the wanted signal range. Differential bus interferences are accordingly clipped off; moreover, reflections on the busline which can occur due to faulty terminations are dampened.

Figure 9:
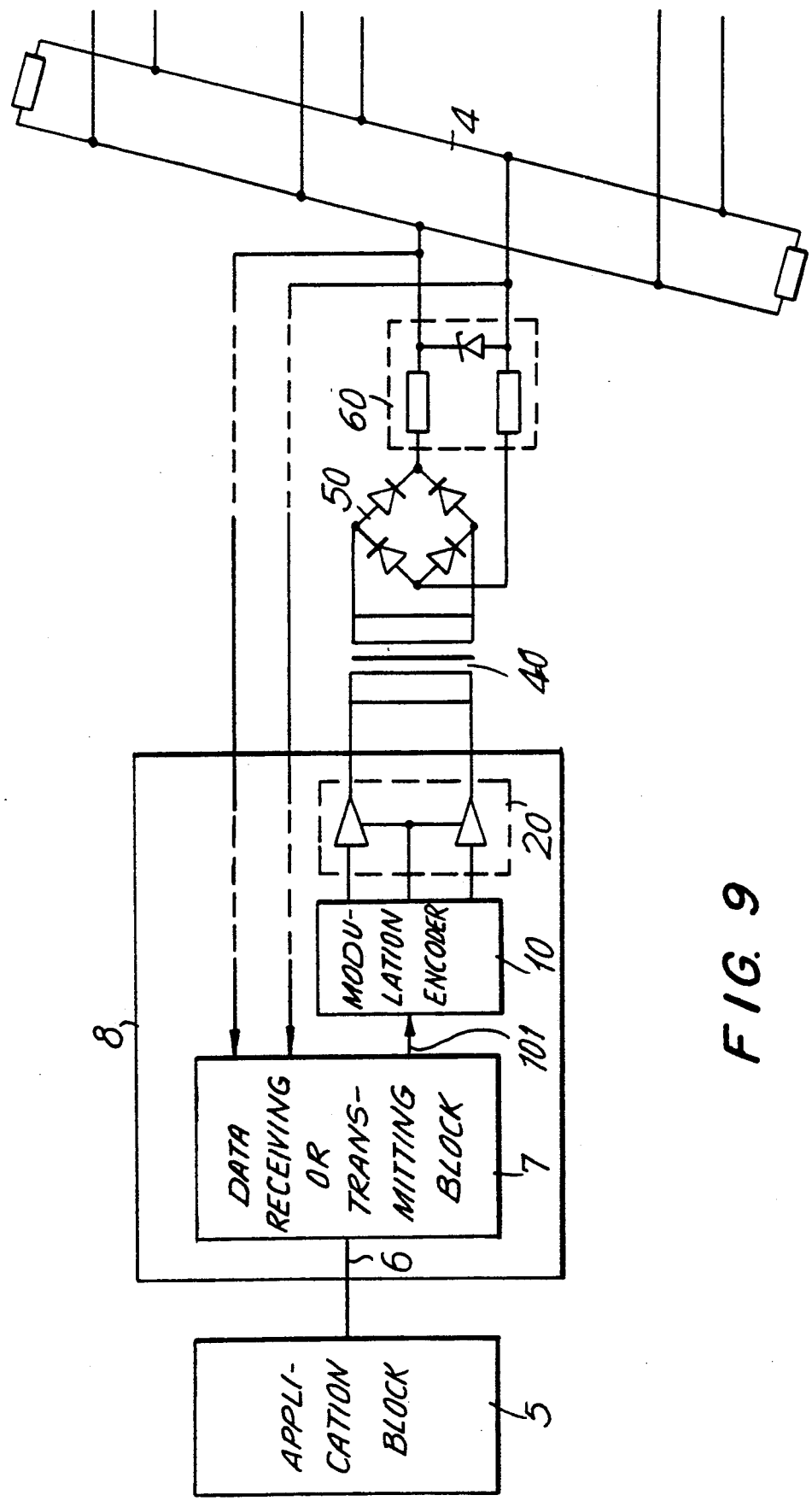
FIGS. 9 and 10 show embodiment of the device of the invention.
Figure 10:
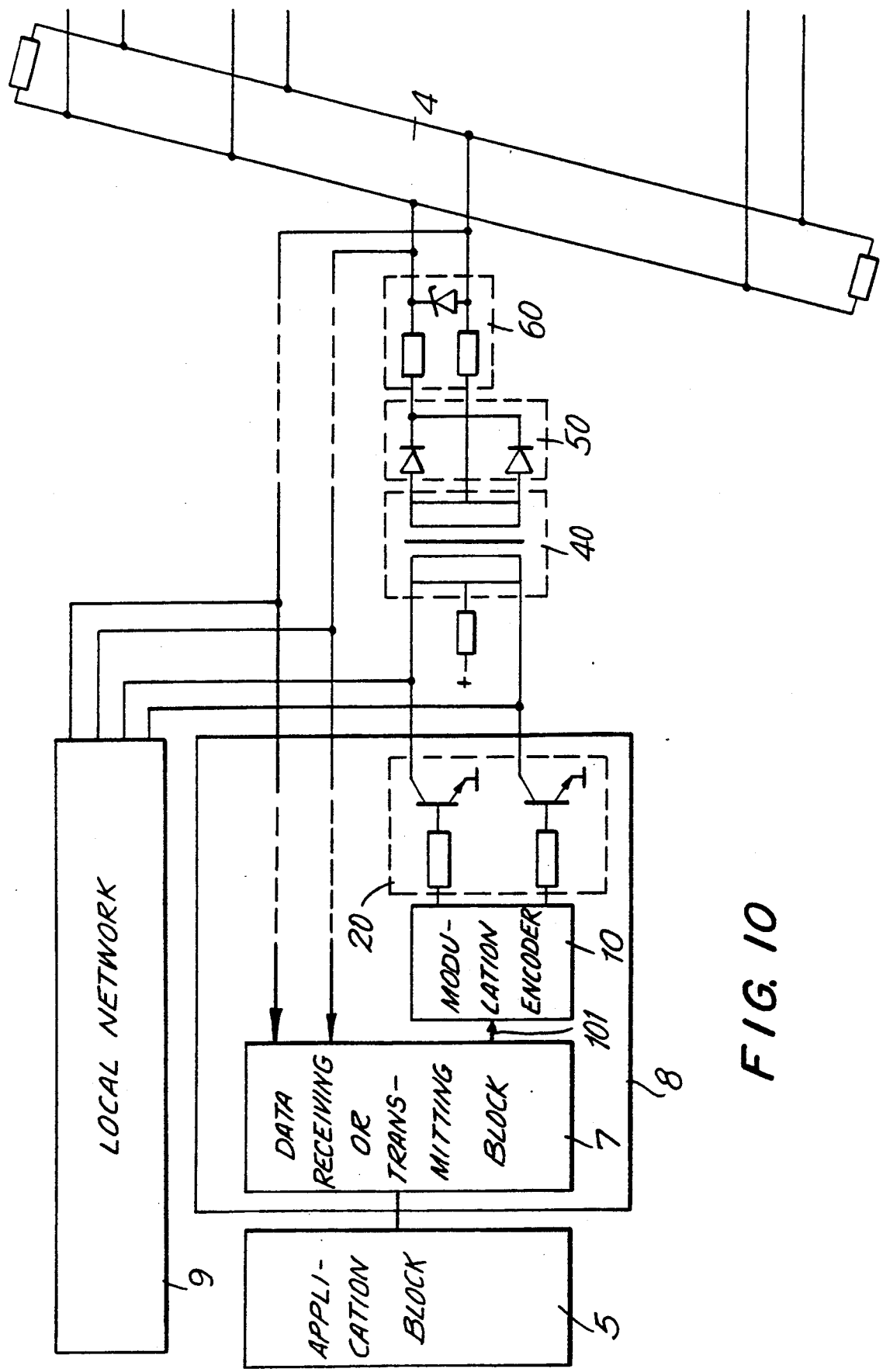

FIG. 9 and 10 show two embodiment examples of a bus station incorporating the device of the invention. The blocks 7, 10 and 20 are integrated in an interface module 8 (e.g. CAN-controller module). Thus, only a few external component elements are necessary, which enables an inexpensive realization.

FIG. 9 shows an embodiment example of a bus system or station with galvanic decoupling circuit 40 using a transformer according to FIG. 6a and subsequent demodulator 50 using Graetz rectification according to FIG. 7a. The interface 7, the modulation encorder 10 according to FIG. 3a and the driver 20 according to FIG. 4b are integrated in the interface module 8.

ADVANTAGES OF THE ARRANGEMENT ACCORDING TO FIG. 9

Inphase interferences on the busline can not cause any differential signal on the secondary side of the transformer, i.e. its effects can not reach the primary side of the transformer and the interface module 8.

Positive differential interferences on the busline have no effect on the transmitting side, since all diodes of the rectifier are in blocking condition.

Negative differential interferences do not cause any differential signal at the transformer, since all diodes of the Graetz rectifier are conductive and accordingly the two connections of the secondary winding are at the same potential.

During failure of one or both drivers or when there is a shorted coil of the transformer at the primary or secondary side, the remaining bus traffic on the busline is not impaired, since the bus is decoupled by means of the rectifier.

FIG. 10 shows an embodiment example of a bus system or station with galvanic decoupling using a transformer having center taps on the primary and secondary sides according to FIG. 6b and subsequent full-wave rectification according to FIG. 7b. The modulation encorder according to FIG. 3a and the driver according to FIG. 4a are integrated in an interface module 8. The block 9, which contains blocks equivalent to 5 and 8, is added as an embodiment example for a local network or substation.

ADVANTAGES OF THE ARRANGEMENT ACCORDING TO FIG. 10

Inphase interferences on the busline can not cause any differential signal on the secondary side of the transformer, i.e. its effects can not reach the primary side of the transformer.

Positive differential interferences on the busline have no effect on the transmitting side, since all diodes of the rectifier block.

Negative differential interferences do not cause any differential signal at the transformer, since two currents of the same magnitude flow in opposite directions in the secondary winding.

During failure of one or both drivers or when there is a shorted coil of the transformer at the primary or secondary side, the remaining bus traffic on the busline is not impaired, since the bus is decoupled by means of the rectifier.

When there are a plurality of local substations the separating device and the demodulator are needed only once, which enables a particularly inexpensive solution.

We claim:

1. A device for potential-free transmission of data in a bus network with bit-by-bit arbitration operation in response to dominant and recessive bit.levels, comprising a series connection of a means for delivering a digital signal to be transmitted, a modulation encoder for scanning dominant levels of said digital signal at equidistant time intervals and delivering two intermediate signals with alternating dominant and recessive single bit levels in the place of scanned portions of said dominant levels; a galvanic separating device for receiving at its inputs said intermediate signals and delivering at its outputs an intermediate output signal which is galvanically separated from the input intermediate signals and free of D.C. components; and a demodulator for converting the intermediate output signal into a demodulated signal which corresponds in shape to said digital signal to be transmitted.

2. A device according to claim 1, characterized in that the decoupling device is a transformer with at least two input connections.

3. A device as defined in claim 1, further comprising a local coupling network, connected between said modulation encoder and galvanic separating device for receiving intermediate signals from modulation encoder of additional potential-free transmission devices.

4. A device as defined in claim 1, further comprising driver circuits connected between said modulation encoder and said galvanic separating device.

5. A device as defined in claim 4, wherein said driver circuits are tri-state drivers.

6. A device as defined in claim 4, wherein said driver circuits are transistors with open collector outputs connected to said separating device.

7. A device according to claim 1, characterized in that a multi-path rectifier, particularly a full-wave or bridge rectifier, is provided as a demodulator.

8. A device according to claim 7, characterized in that a voltage-dependent element, particularly a Zener diode, is arrange on the output side of the rectifier.

9. A device according to claim 1, characterized in that a transformer with center tapping is used as a decoupling device.

10. A device according to claim 1, characterized in that a capacitor four-terminal is used as a decoupling device.

11. A device as defined in claim 1, wherein said modulation encoder comprises a clock signal generator, a D-flip-flop, a T-flip-flop and two AND gates, said digital signal to be transmitted is fed to signal inputs of the two flip-flops, said clock signal generator being connected to clock-inputs of the two flip-flops, one input of the two AND gates being connected to the Q-output of said D-flip-flop, the other input of one of said AND gates being connected to the Q-output of said T-flip-flop, the other input of the other AND gate being connected to the Q-output of said T-flip-flop, and the outputs of respective and gates delivering said intermediate signals.

12. A device as defined in claim 1, wherein time intervals of the dominant single bit levels of one intermediate signal coincide with time intervals of the recessive single bit levels; and time intervals of the dominant single bit levels of the other intermediate signal coincide with time intervals of the recessive signal bit levels of the one intermediate signal.

13. A device as defined in claim 12, wherein the intermediate output signal includes a positive voltage during each dominant bit of the one intermediate signal and a negative voltage during each dominant bit of the other intermediate signal, and zero voltage during coincidence of a recessive bit in both intermediate signals.

* * * * *